Dec. 17, 1968          E. J. GUTNIKOV ET AL          3,416,433
       HYDRAULIC PRESS PLUNGER TRAVEL SPEED GOVERNING DEVICE
Filed March 1, 1967                                  3 Sheets-Sheet 3

United States Patent Office 3,416,433
Patented Dec. 17, 1968

3,416,433
HYDRAULIC PRESS PLUNGER TRAVEL
SPEED GOVERNING DEVICE
Eduard Julievich Gutnikov, ul. Botanicheskaya 23, kv. 19;
Oleg Nikolaevich Melnikov, ul. Bashova 125, kv. 117;
German Borisovich Matjunin, ul. Studencheskaya 13,
kv. 66; and Iosif Ilich Alterman, ul. Krasnykh koman-
dirov 126, kv. 2, all of Sverdlovsk, U.S.S.R.
Filed Mar. 1, 1967, Ser. No. 619,819
5 Claims. (Cl. 100—48)

ABSTRACT OF THE DISCLOSURE

A plunger travel speed governing device for hydraulic presses having an optico-mechanical converter as a speed transmitter unit for providing a precise measurement of speeds of 0.2 mm./sec. and greater. The speed transmitter unit includes two rotating conductive disks having optical gratings and in the area of whose overlapping are located a light source and photocell arranged at both sides thereof, and a damping system of the type of viscid friction on eddy currents for providing a change of the value of damping in accordance with the speed being measured.

---

The present invention relates to plunger travel speed governing devices to be employed when pressing on hydraulic presses.

Known in the art are plunger travel speed governing devices employed when pressing on hydraulic presses, comprising a plunger travel speed transmitter unit and a speed setting unit coupled to a comparison unit which is coupled to the actuating mechanism or servomotor of the governor valve which controls the travel speed of the plunger. In such a governing devices employed as the speed transmitter unit is a tachogenerator which converts the speed directly to voltage (cf. Uralski M.P. and Pavlov S.V. "Automatic Speed Governor for Hydraulic Presses," in "Advanced Scientific, Technical and Industrial Experience" (N°. 3-63-739)9, 1963, pp. 18–25).

The disadvantage inherent in the governing devices known heretofore resides in that the range of controlled speeds cannot be extended with respect to lower speeds of pressing, since considerable difficulties are encountered when measuring low speeds of pressing of the order of 0.20 mm./sec. and lower, due to the fact that the voltage generated by the tachogenerator when measuring such speeds is much less than the contact voltage between the brush and collector. Hence, fluctuations of the contact potential, caused by the brushes passing over different sections of the collector, result in substantial errors, and in case these fluctuations are smoothed by filters, this brings about a decrease in the fast response of the control system. A sufficiently great dry friction of the brushes against the collector alongside of the great moment of inertia make it practically impossible to ensure efficient damping of the speed transmitter at low speeds.

It is an object of the present invention to provide a plunger travel speed governing device to be used when pressing on hydraulic presses featuring a wide range of controlled pressing speeds with respect to lower speeds.

The essence of the invention resides in that in the plunger travel speed governing device adapted to be used when pressing on hydraulic presses, in which the plunger travel speed transmitter unit and the plunger travel speed setting unit are coupled to the comparison unit connected with the actuating mechanism or servomotor of the governor valve controlling the travel speed of the plunger an optico-mechanical converter is employed as the plunger travel speed transmitter unit, with the convertor comprising two rotating disks of an electrtically conductive material having optical gratings located along the circumference of the disks so that the gratings can partially overlap each other a light source and a photocell arranged on both sides of said disks so that their optical axis crosses the region of overlapping of the optical gratings, and damping members arranged along the circumference of disks inducing eddy currents in the disks when the latter are rotating.

The damping members may be electromagnets.

It is expedient to provide the governing device with a range selector switch for switching over the speeds of pressing connected with the damping members, and serving to vary the magnetization current during the working stroke of the plunger when changing over the ranges so that the magnetization current will diminish with an increase of the speed of pressing and increase with a drop of the speed of pressing.

The proposed governing device may be connected with means connected with the damping members and adapted to make the same operative only during the working stroke of the press.

Further objects and advantages of the invention will become more readily apparent to persons skilled in the art from the following specification and accompanying drawings, in which.

Figure 1:
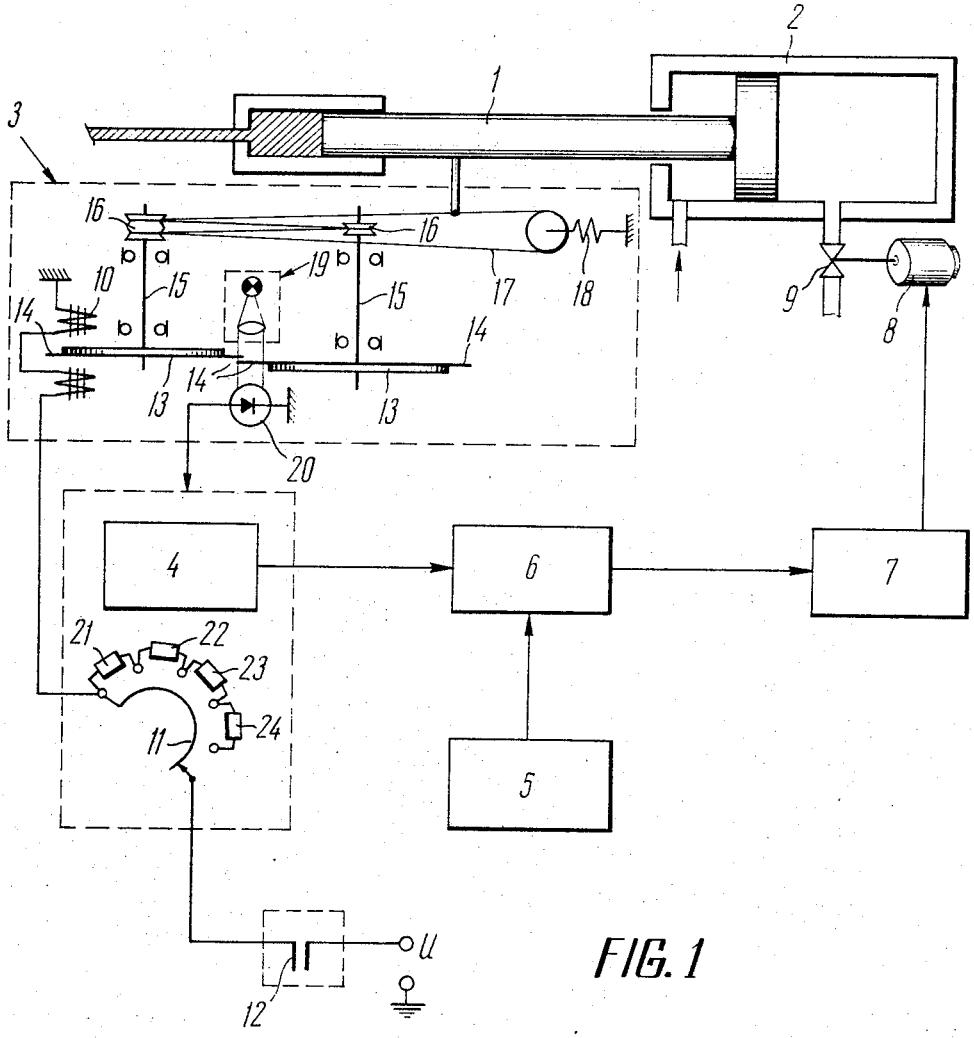
FIG. 1 is a diagrammatic view of the governing device according to the invention.

The governing device for controlling the travel speed of a plunger 1 (FIG. 1) of a press 2 comprises a plunger travel speed transmitter unit 3, a convertor 4, a speed setting unit 5, comparison unit 6, an output device 7 coupled to the comparison unit, and an actuating mechanism or servomotor 8.

The plunger 1 is connected with the speed transmitter unit 3, and the unit 3 is connected with the convertor 4. The outputs of the convertor 4 and the speed setting unit 5 are coupled to the comparison unit 6 which, through the output device 7, is connected with the actuating mechanism or servomotor 8. The servomotor is connected with a governor valve 9. The damping members are essentially electromagnets 10 of the speed transmitter unit 3 which through a range selector switch 11 of the convertor 4 and contacts 12 constituting means for actuating the members, are connected to a source of constant voltage.

The travel speed transmitter unit 3 is an optico-mechanical convertor having two disks 13 of electrically conductive material, e.g., aluminium, and provided with optical gratings 14 arranged along the circumference of the disks 13 with a possibility of a mutual overlapping thereof. The disks 13 are geared with the plunger 1 through shafts 15, pulleys 16 and an endless wire rope 17 tensioned by a device 18. The speed transmitter unit 3 also comprises a light source 19 and photocell 20 whose optical axis crosses the region of overlapping of the optical gratings 14.

The governing device of the invention operates as follows.

The movement of the plunger 1 of the press 2 through the endless wire rope 17 tensioned by the device 18, and the pulleys 16 imports rotation to the two aluminium disks 13 as the disks 13 are mounted on the shafts 15. The optical gratings 14 along the circumferences of the disks intersect on the line of the light source 19 and photocell 20, modulating thereby the light beam falling on the photocell 20. The damping members namely the electromagnets 10, create a braking moment in the disks 13 proportional to the speed of rotation thereby ensuring the operation of the speed transmitter unit 3, which is an oscillatory system of the second order, in a aperiodic mode at least at low speeds, when in the circuit of the electromagnets 10, the selector switch 11 sets the maximum value of the magnetization current. In the course of operation at higher speeds, when the friction of the bearings of the transmitter unit 3 becomes negligible as compared with the damping moment, the latter may be diminished, since the disturbing effect of friction of rest and the friction of motion jumps affecting the transmitter unit, ceases.

In addition, the reduction of the damping moment with an increase in the speed is desirable to attain the following results: to reduce the heating of the transmitter unit with eddy currents at high speeds; to reduce the load on the wire rope and the bearing blocks of the transmitter unit; and to prevent the possibility of the wire rope slippage and, hence its wear.

The signal, taken from the photocell 20 of the transmitter unit 3, whose frequency is proportional to the plunger travel speed, is fed to the convertor 4. The output signal of the convertor 4, together with the setting signal from the speed setting unit 5, is fed to the inputs of the comparison unit 6. The signal of difference between the preset and actual speeds of the plunger travel (the mismatch signal) taken from the comparison unit, and through the output device 7 is fed to the actuating mechanism or servomotor 8 which drives the governor valve 9 so as to reduce the mismatch thereby equalizing the actual speed of pressing and the preset speed.

To reduce mechanical loads on the transmitter unit 3 and the endless wire rope 17 thereof, the excitation voltage of the electromagents 10 is supplied by the contacts 12 only during the working stroke of the press. During the molding, idle stroke and stoppage of the press the contacts 12 are open. For the same purpose, when the preset speed of pressing is increased by switching over the range selector switch 11, the magnetization current is diminished by connecting additional resistors 21, 22, 23, 24.

Figure 2:
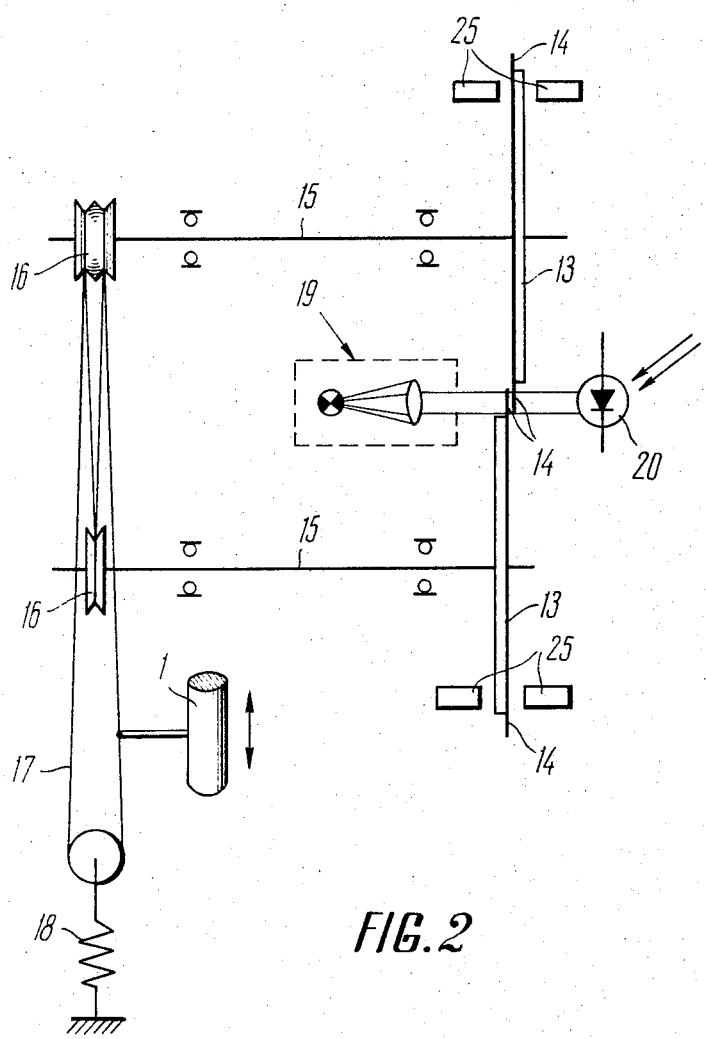
FIG. 2 is a diagrammatic view of the plunger travel speed transmitter unit of the invention.

Those cases in which the range of working speeds of the press is small, a transmitter unit may be used such as shown in FIG. 2 as the speed transmitter means, and in which the damping magnetic field is created by permanent magnets 25.

Figure 3:
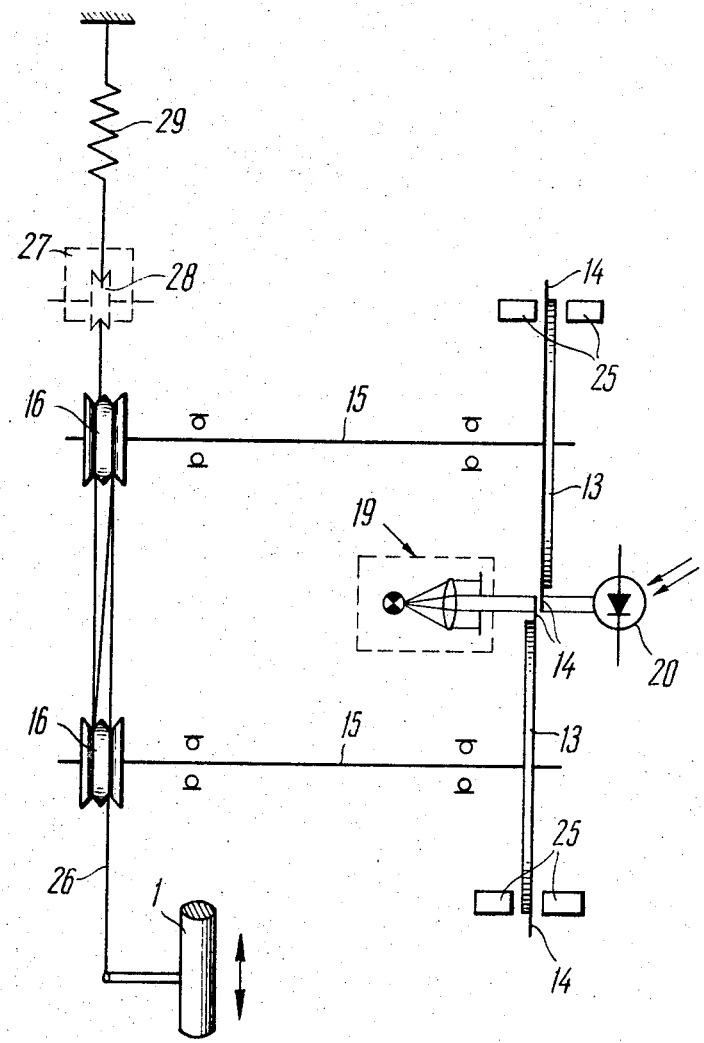
FIG. 3 is a diagrammatic view illustrating the mounting of the transmitter unit on the press.

To facilitate the mounting of the transmitter unit on the press, an open wire rope 26 (FIG. 3) may be used instead of the endless wire rope 17, and the required tension in the rope 26 is effected either by a weight 27 suspended on the rope and passing over a pulley 28, or by spring means 29 which provides for paying out of the wire rope equal to the travel of the press plunger. The use of the speed transmitter unit in the plunger travel speed governing device make it possible to provide a governing device with a lower limit of the speed of 0.05 mm./sec. The governing device ensures good control over the entire range of pressing speeds, thereby resulting in an increased efficiency of the press due to the possibility of operating at upper limits of permissible speeds, as well as an improved quality of pressed articles and a reduction of rejects arising at sharp speed fluctuations.

Though the present invention is described in connection with the preferred embodiment thereof, it is to be understood, that changes and modifications may be resorted to without departing from the spirit and scope of the invention, as those skilled in the art will easily understand.

Such changes and modifications are to be considered as falling within the true spirit and scope of the invention as defined in the appended claims.

We claim:
1. A governing device for controlling the plunger travel speed when pressing on hydraulic presses comprising a plunger travel speed transmitter unit, which is an opticomechanical converter having two rotating disks of electrically conducting material, optical gratings arranged along the circumference of said disks which partially overlap, a source of light and photocell disposed on both sides of said disks so that their optical axis intersects the region of overlapping of said optical gratings; damping members arranged along the circumference of said disks and inducing eddy currents therein in the course of their rotation; a plunger travel speed setting unit; a comparison unit to which said transmitter unit and said plunger travel speed setting unit are coupled; an actuating mechanism connected with said comparison unit, and a governor valve controlling the travel speed of the plunger coupled to said actuating mechanism.

2. The governing device according to claim 1, wherein said damping members are electromagnets.

3. The governing device according to claim 2, wherein a selector switch is provided for changing over the ranges of pressing speeds, said selector switch being connected with said electromagnets to change the magnetization current during the working stroke of the press plunger when changing over the ranges so that the excitation current be reduced when the speed of pressing increases, and vice versa.

4. The governing device according to claim 2, wherein a means is provided to actuate said damping members only during the working stroke of the press.

5. The governing device according to claim 3, wherein a means is provided to actuate said damping members only during the working stroke of the press.

References Cited
UNITED STATES PATENTS

| | | | |
|---|---|---|---|
| 3,138,976 | 6/1964 | Robra | 100—48 |
| 3,196,647 | 7/1965 | Schneider | 100—430 XR |

FOREIGN PATENTS

| | | |
|---|---|---|
| 271,687 | 3/1914 | Germany. |

BILLY J. WILHITE, *Primary Examiner.*